(12) United States Patent
Minger

(10) Patent No.: US 6,837,646 B1
(45) Date of Patent: Jan. 4, 2005

(54) SYSTEM FOR INSTALLING UNDERGROUND PIPE

(75) Inventor: Patrick Minger, 2218 Lukewood Dr., Chanhassen, MN (US) 55317

(73) Assignee: Patrick Minger, Chanhassen, MN (US)

(*) Notice: Subject to any disclaimer, the term of this patent is extended or adjusted under 35 U.S.C. 154(b) by 0 days.

(21) Appl. No.: 10/427,048

(22) Filed: Apr. 29, 2003

Related U.S. Application Data

(60) Provisional application No. 60/376,358, filed on Apr. 29, 2002.

(51) Int. Cl.$^7$ .................................................. F16B 2/14
(52) U.S. Cl. .................. 403/374.4; 403/22; 403/48; 403/297; 403/214; 403/374.1; 403/374.2; 403/374.3
(58) Field of Search ........................... 285/92; 166/217, 166/139; 403/1, 22, 26, 43, 48, 292, 297, 314, 373, 374.1, 374.2, 374.3, 374.4; 269/47, 48.1, 48.2, 48.3, 49, 50, 51, 43; 72/393, 454; 384/49

(56) References Cited

U.S. PATENT DOCUMENTS

| | | | | |
|---|---|---|---|---|
| 3,031,995 A | * | 5/1962 | Taylor, Jr. ................... | 269/48.1 |
| 3,674,055 A | * | 7/1972 | Ray | |
| 3,742,186 A | * | 6/1973 | Finkel et al. ............... | 269/48.1 |
| 3,986,383 A | * | 10/1976 | Petteys ........................ | 72/393 |

* cited by examiner

*Primary Examiner*—Daniel P. Stodola
*Assistant Examiner*—Victor MacArthur
(74) *Attorney, Agent, or Firm*—Haugen Law Firm PLLP

(57) ABSTRACT

A tensioning apparatus for operably applying forces to inner surfaces of a hollow body includes a bracing nut having a first receptacle portion and a bracing portion, an axially movable rod that is operably coupled to the bracing nut such that a first portion of the rod is selectively axially movable within the bracing nut, a wedge structure that is operably engaged with the rod for coaxial movement therewith, and a tensioning body that is operably and slidably engaged with the wedge structure. The tension body and the wedge structure have corresponding and facing sloped surfaces such that selectively axial motion of the rod correspondingly and coaxially moves the wedge structure, which coaxial movement of the wedge structure therefore progressively radially displaces the tensioning body to provide tensioning forces against respective inner surfaces of the hollow body.

12 Claims, 3 Drawing Sheets

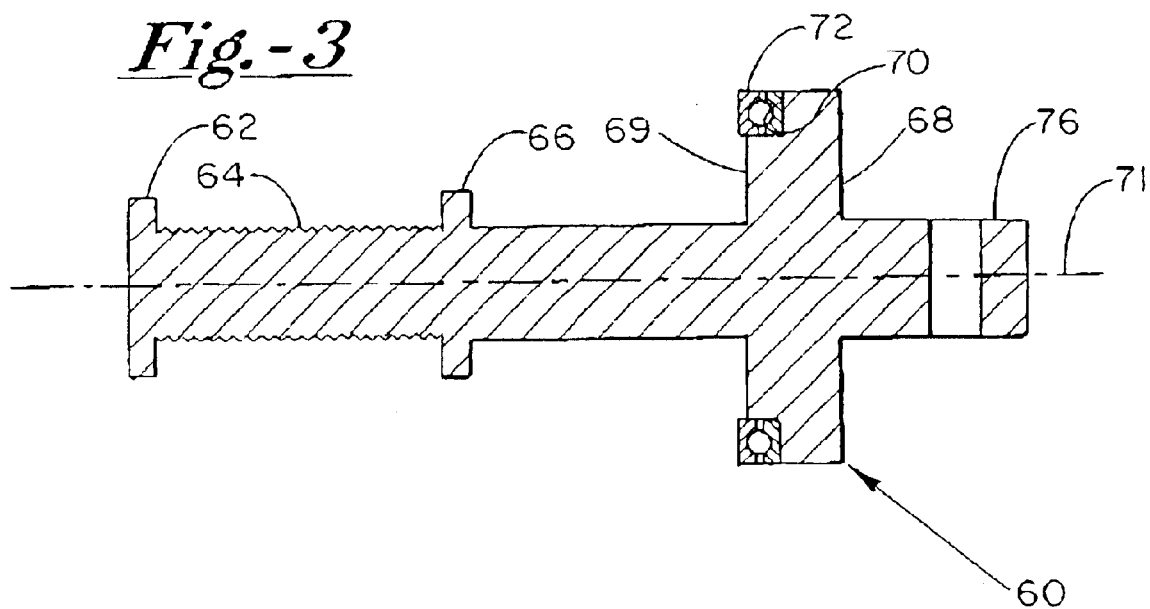
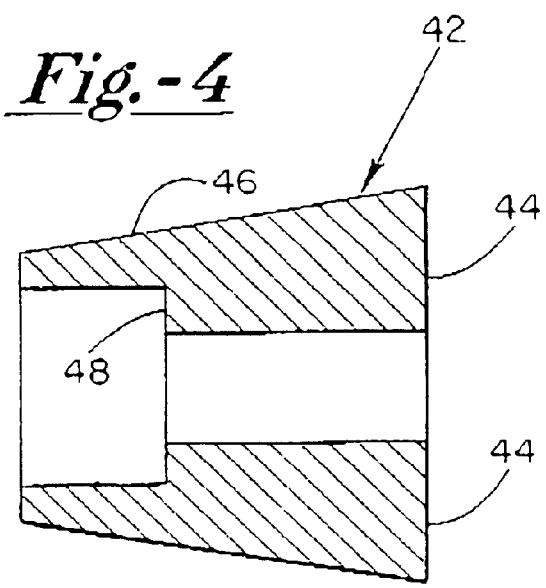

SYSTEM FOR INSTALLING UNDERGROUND PIPE

CROSS-REFERENCE TO RELATED APPLICATION

This application claims priority from Provisional Patent Application Ser. No. 60/376,358, filed Apr. 29, 2002, the contents of which are herein incorporated in its entirety.

FIELD OF THE INVENTION

The present invention relates to systems for installing underground pipe, generally, and more particularly to devices and methods for installing sectioned pipe into pre-bored underground channels.

BACKGROUND OF THE INVENTION

The present invention is contemplated for use with underground channel boring systems, the invention being adapted to simplify and expedite the installation of pipes into such underground channels. In typical applications, underground channels are bored between two predetermined points, which points are typically exposed to the surface for access by personnel and/or equipment. A particular such channel boring operation provides for initial boring by a linearly-driven pilot tube, which pilot tube establishes a pathway for which channel boring augers may follow from a starting point to an end point.

Preferably, the starting and ending points for channel boring are defined by personnel/equipment shafts which extend upwardly to the ground surface. In such a manner, boring equipment and pipes may be staged, assembled, or disassembled within respective personnel/equipment shafts. Typically, however, the bored channels are too long for a single pipe section to be brought into the respective personnel/equipment shafts and subsequently positioned within the bored underground channel. Therefore, the underground pipes must be assembled from a plurality of pipe sections that are sequentially inserted into the underground channel. Systems available today for installing such pipe sections are relatively time consuming and expensive. In addition, available means for holding adjacent pipe sections together during the pipe insertion process are typically not strong enough to reliably insert such pipe sections into a bore having an inner diameter substantially similar to the outer diameter of the sectioned pipe. Forces exerted on the sectioned pipe, particularly at the respective connection points, can result in undesired separation of the pipe sections.

Therefore, it is a primary object of the present invention to provide a means for installing a plurality of mutually secured pipe sections into an underground channel in an expeditious and cost-effective manner.

It is a further object of the present invention to provide a means for internally grasping and maintaining adjacent pipe sections in axially connected relationship with one another during insertion thereof into a bored channel.

It is a still further object of the present invention to provide an internal tensioning means for selectively and repositionably grasping adjacently connected pipe sections, which tensioning means is configured so as to be manipulated by existing equipment used for boring underground channels.

SUMMARY OF THE INVENTION

By means of the present invention, a device and system is provided for securably positioning sectioned pipe into bored channels of a diameter similar to that of the pipe. The selectively and remotely positionable device of the present invention expansively provides tension forces to respective pipe sections across seams therebetween, which tension forces are sufficient to maintain the axially connected relationship between such adjacent pipe sections during pipe installation. The present assembly is preferably configured to adapt to mechanized components commonly utilized in underground channel boring operations. As such, the apparatus of the present invention may be easily assimilated into current pipe installation procedures for enhanced stability and reliability of installed sectioned pipe integrity.

In a particular embodiment of the present invention, the tensioning apparatus includes a bracing nut having a first receptacle portion and a bracing portion, an axially movable rod that is operably coupled to the bracing nut such that a first portion thereof is selectively axially movable therewithin, and a wedge structure having a first inner surface and a second outer surface, with the second outer surface being sloped with respect to the first inner surface, the first inner surface being operably engaged with an outer surface of the rod for coaxial movement therewith, the wedge structure at least partially concentrically surrounding a second portion of the rod. The tensioning apparatus preferably further includes a tensioning body having a first inner surface and a second outer surface, with the first inner surface being operably and slidably engaged with the second outer surface of the wedge structure. The first inner surface of the tensioning body is preferably sloped with respect to the second outer surface thereof, such that the second outer surface of the tensioning body is operably disposed in a generally parallel relationship with the first inner surface of the wedge structure. The first inner surface of the tensioning body and the second outer surface of the wedge structure are in facing relationship with one another, such that selectively axial motion of the rod correspondingly and coaxially moves the wedge structure, which coaxial movement of the wedge structure progressively radially displaces the tensioning body.

The present invention further contemplates and includes a method for retaining a hollow sectioned body in an axially connected disposition through the application of tension forces to inner surfaces thereof. Such a method includes providing a plurality of hollow body sections in axially adjacent and connected relationship with one another, and providing a tensioning apparatus having a bracing nut which has first and second receptacle portions and a bracing portion, with the second receptacle portion being positioned at a side opposite to the first receptacle portion, and the second receptacle portion being specifically configured to operably receive a control rod for axial manipulation of the tensioning apparatus. The bracing portion of the bracing nut is preferably radially disposed about the first receptacle in a plane perpendicular to a central axis of the bracing nut. The tensioning apparatus further includes an axially movable rod that is operably coupled to the bracing nut such that a first portion thereof is threadably received in the bracing nut, a wedge structure having a first inner surface and a second outer surface, with the second outer surface being sloped with respect to the first inner surface, the first inner surface being operably engaged with an outer surface of the rod for coaxial movement therewith, the wedge structure at least partially concentrically surrounding a second portion of the rod, and a tensioning body having a first inner surface and a second outer surface. The first inner surface of the tensioning body is operably and slidably engaged with the wedge structure, and the first inner surface thereof is sloped with respect to the second outer surface such that the second outer surface of the tensioning body is operably disposed in a generally parallel relationship with the first inner surface of the wedge structure. The first inner surface of the tensioning body and the second outer surface of the wedge structure are in facing relationship with one another, such that rotation of the rod results in axial motion along an axis of rotation thereof in a first direction correspondingly and coaxially moves the wedge structure, which coaxial movement of the wedge structure progressively outwardly and radially displaces the tensioning body. The method further includes positioning the tensioning body within the hollow sectioned body at a seam between adjacently connected body sections, and rotating the rod to threadably and axially move the rod in the first direction to thereby radially displace the tensioning body toward respective inner surfaces of the body sections. The method continues by engaging the second outer surface of the tensioning body with respective inner surface of the hollow body sections to thereby obtain a tension force therebetween that is sufficient to maintain the hollow body sections in adjacent axially connected relationship with one another upon insertion into a correspondingly-configured bore.

BRIEF DESCRIPTION OF THE DRAWINGS

FIG. 3 is a cross-sectional view of a threaded rod component of the tensioning apparatus of the present invention.

FIG. 4 is a cross-sectional view of a wedge means component of the tensioning apparatus of the present invention.

DETAILED DESCRIPTION OF THE PREFERRED EMBODIMENTS

The objects and advantages enumerated above together with other objects, features and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
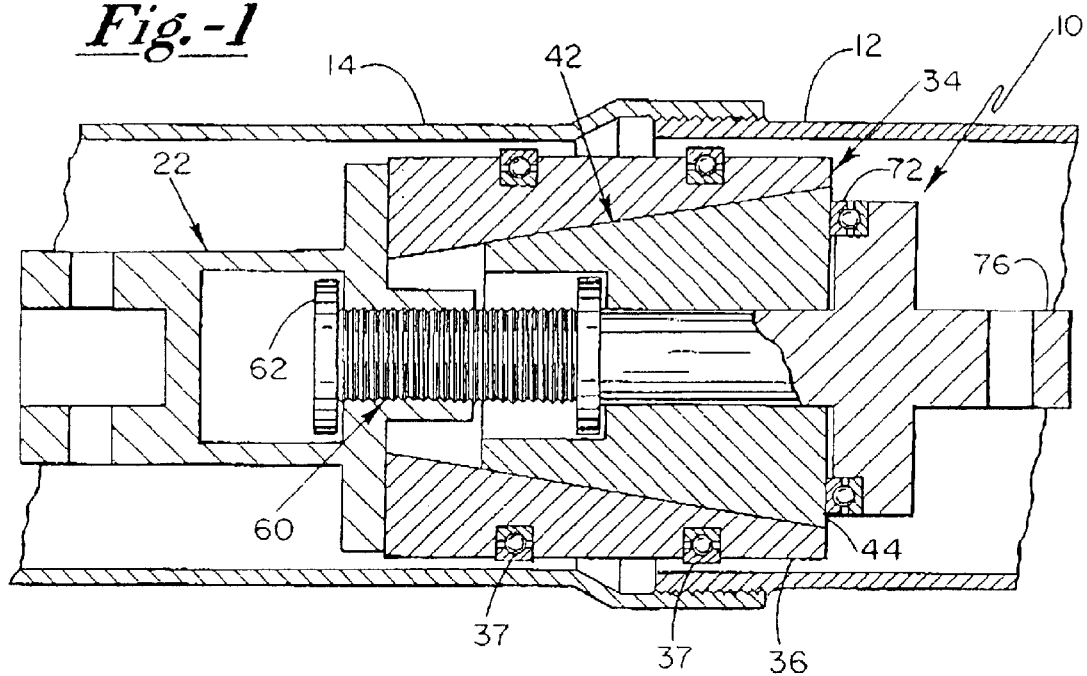
FIG. 1 is a cross-sectional view of a tensioning apparatus of the present invention, as disposed within a sectioned pipe while in a contracted state.
Figure 2:
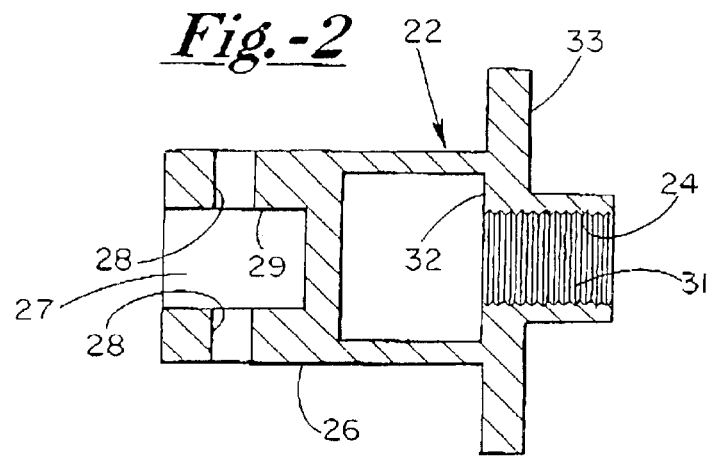
FIG. 2 is a cross-sectional view of a bracing means component of the tensioning apparatus of the present invention.

With attention now to characters of reference to the drawings, and first to FIG. 1, a tensioning device 10 of the present invention is illustrated as being disposed within adjoining pipe sections 12, 14. As shown in FIG. 1, tensioning device 10 includes a bracing portion 22, an axially-extending tension portion 34, a wedge portion 42 and a threaded rod 60. In operation, threaded rod 60 acts to axially push or pull wedge portion 42, such that tension portion 34 is selectively circumferentially displaced so as to selectively engage inner surfaces of respective adjacent pipe sections 12, 14.

Bracing portion 22 is preferably configured substantially as a threaded nut, with threaded portion 24 disposed oppositely of connector portion 26. Connector portion 26 is preferably configured to engagably receive a correspondingly configured control rod (not shown) in socket 27. In a particular embodiment of the present invention, the control rod includes extendable dogs which engage in locking recesses 28 of socket 27. Locking recesses 28 are preferably specifically configured to receive the extendable dogs on the control rod, and are preferably positioned in substantially opposing surfaces of socket 27. In other embodiments of the present invention, locking recess 28 is a continuous annular groove disposed in inner surface 29 of socket 27. In such a manner, an annular ring or other radial extension on the control rod may be fittingly engaged within locking recess 28.

Once a secure engagement is obtained between the control rod and bracing portion 22, the control rod may be manipulated to axially move bracing portion 22, as well as all other attached components of tensioning device 10, within the respective underground pipe. The present invention contemplates a variety of configurations for the securing engagement between bracing portion 22 and the control rod. Preferably, however, a removable "snap-fit" engagement therebetween is most preferred. Therefore, any protrusions such as extendable dogs on the control rod are preferably selectively retractable when disengagement of the control rod from bracing portion 22 is desired.

In preferred embodiments of the invention, threaded portion 24 is substantially oppositely disposed from socket 27 in bracing portion 22, and most preferably disposed along a central axis of bracing portion 22. Thus, rotational threading engagement at threaded portion 24 is about a central axis defined thereby. Threaded portion 24 of bracing portion 22 further defines an opening to threaded rod receiving port 31. Receiving port 31 provides excess space into which first bearing portion 62 of threaded rod 60 may axially move. As shown in FIG. 1, receiving port 31 is sized and configured to accommodate first bearing portion 62 of threaded rod 60. In operation, first bearing portion 62 of threaded rod 60 is retained within inner surface 32 of receiving port 31 to thereby maintain engagement between threaded rod 60 and bracing portion 22.

Threaded rod 60 is shown in an isolation view of FIG. 3. Threaded rod 60 includes threaded portion 64 which is preferably sized and configured to threadably mate with threaded portion 24 of bracing portion 22. In addition to first bearing portion 62, threaded rod 60 preferably includes second bearing portion 66 and third bearing portion 68 disposed at specific intervals along the length of threaded rod 60. Respective bearing portions 62, 66, 68 extend substantially transversely to a longitudinal axis 71 of threaded rod 60.

As shown in FIG. 3, third bearing portion 68 preferably includes a cut-out portion 70 radially disposed therein. In preferred embodiments, cut-out portion 70 is a radius sized and configured to receive a ring bearing 72 therein. Ring bearing 72 provides for efficient rotational movement of threaded rod 60 as bearing surface 69 is placed in close proximity to a respective surface of wedge portion 42. In operation, ring bearing 72 is in contact with an exterior surface 44 of wedge portion 42, such that bearing surface 69 is not frictionally engaged with surface 44 during rotation of threaded rod 60.

Threaded rod 60 further includes a coupling portion 76 that is sized and configured to receive a rotatable device thereto. In preferred embodiments of the present invention, the rotating spindle which drives the soil boring device is adapted to operably couple to coupling portion 76 of threaded rod 60. In such a manner, rotational movement may be employed upon threaded rod 60 from the soil boring device in selectively clockwise or counter-clockwise direction. Direct coupling of such rotation means provides selective axially movement of threaded rod 60 within tensioning device 10 via respective threaded portions 64 and 24.

Wedge portion 42 is shown in isolation view in FIG. 4. In preferred embodiments, wedge portion 42 includes an inclined bearing surface 46 upon which radially extending tension portion 34 operably bears. When assembled in tensioning device 10, first bearing surface 44 of wedge portion 42 is selectively pressed against by third bearing portion 68 through threaded rotation of threaded rod 60 during the engagement sequence of tensioning device 10 expanding radially outwardly toward inner surfaces of respective pipe sections 12, 14. Second bearing surface 48 of wedge portion 42 is primarily preferably placed into contact with second bearing portion 66 of threaded rod 60 during threaded retraction of threaded rod 60 from bracing portion 22. During such a sequence, second bearing portion 66 progressively bears against second bearing surface 48 of wedge portion 42 to thereby retract radially expanding tensioning means 34 inwardly. In such a manner, wedge portion 42 is operably utilized to selectively radially expand and contract tensioning device 10 via inclined bearing surface 46.

Figure 5:
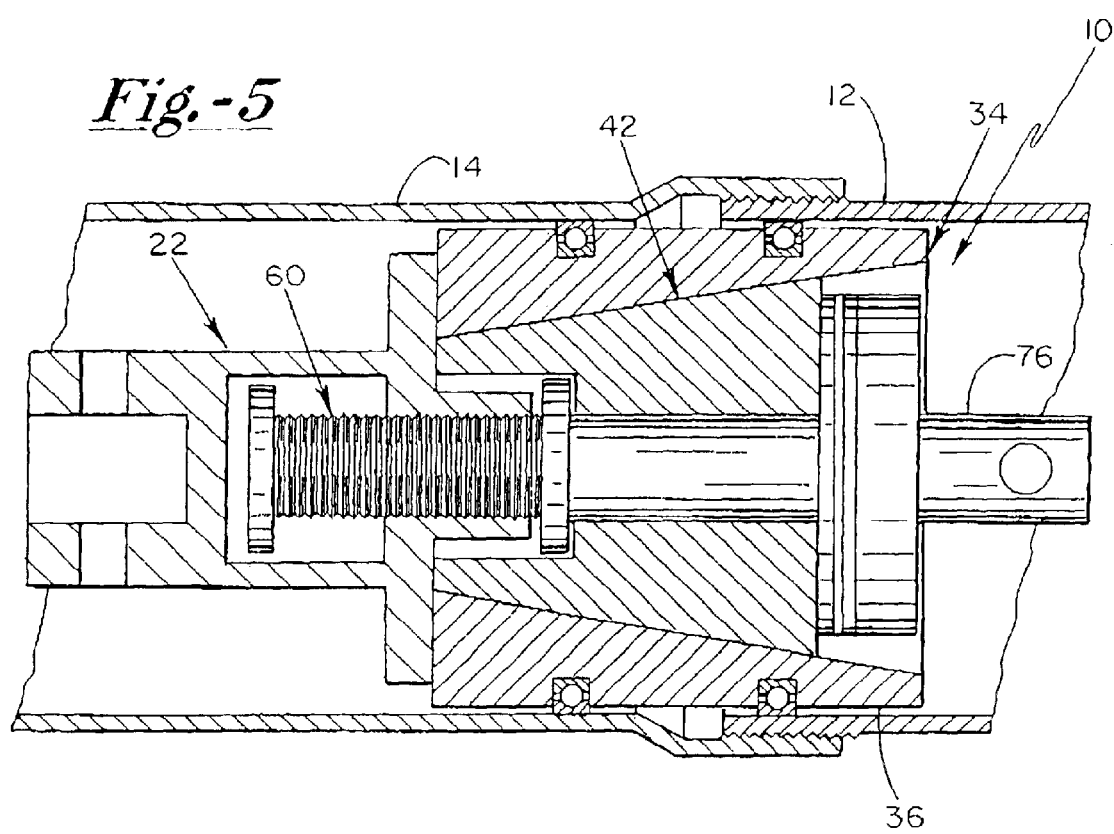
FIG. 5 is a cross-sectional view of the apparatus illustrated in FIG. 1, with the illustration in FIG. 5 showing the tensioning apparatus in an expanded state.

With reference now to FIGS. 1 and 5, tensioning device 10 is illustrated in both an expanded and a contracted state. Tensioning device 10 is illustrated in a contracted configuration in FIG. 1, with threaded rod 60 disposed in a relatively extended position, minimally threaded within bracing portion 22. The control rod manipulates bracing portion 22, as well as the remainder of tensioning device 10, into a position adjacent a seam between respective pipe sections 12, 14. Once tensioning device 10 has been properly positioned, rotation of threaded rod 60 is initiated by the rotation means of the boring device (not shown). A predefined rotational direction, i.e. clockwise, causes the threaded engagement between threaded portion 64 of threaded rod 60 and threaded portion 24 of bracing portion 22 to axially move threaded rod 60 into receiving port 31 of bracing portion 22. Axial movement of threaded rod 60 dictated by the aforementioned threaded engagement results in pressure imparted upon first bearing surface 34 of wedge portion 42 from third bearing portion 68 of threaded rod 60. In preferred embodiments, bearing 72 transfers the pressure from bearing portion 68 of threaded rod 60 to first bearing portion 44 of wedge portion 42, thereby minimizing frictional forces developed at the interface between third bearing portion 68 and wedge portion 42 due to rotational movement of threaded rod 60.

Continued rotation of threaded rod 60, and the resultant force upon first bearing surface 44, moves wedge portion 42 axially toward bracing portion 22. During such axial movement of wedge portion 42, inclined bearing surface 46 progressively displaces tensioning portion 34 radially outwardly. Such radial displacement is obtained due to the respective corresponding inclined surfaces of wedge portion 42 and tensioning portion 34. In addition, bracing surface 33 of bracing portion 22 prevents axial displacement of tensioning portion 34 as a result of axial movement of wedge portion 42 and the associated frictional forces therebetween.

Rotation of threaded rod 60 is preferably continued until desired engagement is obtained between tension surface 36 of tensioning portion 34 and respective inner surfaces of pipe sections 12, 14. In a preferred embodiment of the present invention, one or more roller bearings 37 are provided in bearing surface 36 of tensioning means 34, such that frictional forces developed between the rotating tension device 10 and respective pipe sections 12, 14 is minimized. Such roller bearing 37 may be of any desired configuration, so long as frictional forces between tensioning means 34 and respective pipe sections 12, 14 are dissipated thereby.

In some embodiments of the present invention, wedge portion 42 and tensioning portion 34 are removably or permanently engaged with one another through various engagement means. An example of such an engagement means includes a tongue and groove configuration, whereby wedge portion 42 and tensioning portion 34 are slidably and engagably received in one another. Such engagement between wedge portion 42 and tensioning portion 34 promotes reliable radial expansion and contraction, and minimizes risk of undesired disassembly of tensioning device 10.

In some embodiments of the present invention, tensioning portion 34 is removably and slidably engaged with bracing surface 33 of bracing portion 22. Such engagement further promotes reliable and accurate expansion and contraction of tensioning device 10.

Preferably, wedge portion 42 is removably or permanently engaged with rod 60 through various engagement means. An example of such an engagement means includes a tongue and groove configuration whereby wedge portion 42 is slidably and engagably secured to rod 60.

Tensioning device 10 is illustrated in FIG. 5 in an expanded configuration, whereby tensioning portion 34 is in physical abutment with respective inner surfaces of pipe sections 12, 14. Such an abutment creates a tensioning engagement therebetween, and acts to assist in holding respective pipe sections 12, 14 together. As illustrated in FIGS. 1 and 5, respective pipe sections 12, 14 are preferably threadably engaged with one another. In other embodiments, however, respective pipe sections 12, 14 may be engaged through other means, such as fasteners, adhesives, or the like. As the engaged pipe sections 12, 14 are inserted into the bored underground channel, resistive forces such as impediments or friction alone create an environment and potential of disengagement between respective pipe sections 12, 14. Tensioning device 10 of the present invention is specifically designed to assist in preventing such disengagement between respective pipe sections 12, 14. By providing sufficient expansion force on the inner surfaces of respective pipe sections 12, 14, a tension force is created therebetween due to the high levels of friction between tensioning surface 36 and respective pipe sections 12, 14. To enhance the frictional force developed between tensioning surface 36 and respective inner surfaces of pipe sections 12, 14, tensioning surface 36 may be uneven, or "jagged". Such an uneven surface acts to partially bite into the respective inner surfaces of pipe sections 12, 14, thereby enhancing the frictional force obtained. Such frictional force inhibits relative axial motion between respective pipe sections 12, 14.

In some embodiments of the present invention, pipe sections 12, 14 may not be engaged in an overlapping relationship, as is illustrated in the figure. In such embodiments, respective pipe sections 12, 14 may be placed in substantially abutting configuration. To assist in engaging the respective pipe sections to one another in such an embodiment, adhesives or separate fastening devices, or both are preferably utilized. Such a fastening device may include, for example, an external ring binder which extends circumferentially about respective pipe sections 12, 14 at the seam between respective abutted sections. In such embodiments, the tensioning device 10 of the present invention is highly desirable to obtain a tension force between respective pipe sections 12, 14.

In preferred embodiments of the present invention, tensioning device 10 is able to develop at least about 25,000 pounds of expansion force, and up to about 70,000 pounds of expansion force. Such an expansion force creates a more than necessary amount of tension force (as a result of friction between tensioning portion 34 and respective pipe sections 12, 14) to maintain engagement between respective pipe sections 12, 14 during pipe insertion into the underground bored tunnel.

In operation, tensioning device 10 is utilized to enhance engagement between respective adjacent pipe sections during insertion into the underground channel. The selective expansion/contraction capability of tensioning device 10 allows the tensioning device 10 to be selectively utilized at multiple locations along the constructed pipe. To contract tensioning device 10, rotation in a direction opposite of that needed to expand tensioning device 10 is provided to threaded rod 60 via the boring apparatus. Such opposite rotation of threaded rod 60 results in second bearing portion 66 of threaded rod 60 operably bearing against second bearing surface 48 of wedge portion 42. Therefore, second bearing portion 66 pushes against second bearing surface 48 of wedge portion 42 to thereby axially move wedge portion 42 away from bracing portion 22. In such a manner, tensioning portion 34 is moved radially inwardly due to the corresponding engaged inclined surfaces between tensioning means 34 and wedge portion 42.

When in a contracted configuration, tensioning device 10 may be moved axially within the constructed pipe by the control rod. Therefore, tensioning device 10 may be selectively moved to the next pipe section seam to assist in holding the respective pipe sections to one another during insertion through the underground channel.

A torque of up to 50 ft-lbs. may be required of the rotation generation system to enable tensioning device 10 to develop up to 70,000 pounds of expansion force. In addition, forces up to 200 pounds may be required to insert the assembled pipe into and through the underground channel. A substantial portion of this needed force may impinge upon the seams between respective pipe sections 12, 14, as a result of friction or impediments in the pipe insertion path. To prevent separation of respective adjacent pipe sections, tensioning device 10 may preferably be utilized.

Though a wide variety of pipe sizes and tensioning device dimensions are contemplated by the present invention, it is particularly preferred for use in pipe applications having inside diameters of greater than 4 inches. Though the present invention may be used in applications of smaller dimensions, it is particularly useful for larger applications, where forces resistant to pipe insertion into the underground channel are substantially increased. A particular application contemplated for the present invention is in the insertion of 15 inch ID sewer pipe in 10 foot long sections. Such pipe is preferably polymeric in nature, and most preferably polyvinyl chloride (PVC). PVC pipe material is preferred for its strong and durable physical characteristics, whereby cracking or breakage or the pipe due to expansion forces generated by tensioning device 10 of the present invention are minimized. Any typically used underground pipe material may also be used in conjunction with the tensioning device of the present invention. It is contemplated that tensioning device 10 is widely applicable, and can be used wherever expansion within a pipe is desired.

Preferably, the components comprising the present invention are fabricated from relatively strong and durable materials such as steel or the like. Though metal materials are particularly preferred for the applications described herein, a variety of other materials may be utilized instead.

The invention has been described herein in considerable detail in order to comply with the Patent Statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A tensioning means for operably applying forces to respective inner surfaces of axially adjacent hollow bodies, said tensioning means comprising:

(a) a bracing means having a first receptacle portion and a bracing portion;

(b) an axially movable rod that is threadably received in to said bracing means such that a first portion thereof is selectively axially movable therewithin, said rod including a first annular portion extending radially outwardly from a first end thereof, said first annular portion being configured to retain said first portion of said rod in said first receptacle of said bracing portion, and second and third annular portions extending radially outwardly from a second portion of said rod;

(c) a wedge means having a first inner surface and a second outer surface, said second outer surface being sloped with respect to said first inner surface, said first inner surface being operably disposed adjacent to an outer surface of said rod for coaxial movement therewith and at least partially concentrically surrounding a second portion of said rod, said wedge means further including a third end surface extending perpendicularly from said first inner surface and between said first and second surfaces of said wedge means, said third end surface being operably disposed adjacent to said third annular portion of said rod, such that axial movement of said rod in a first direction causes said third end surface of said wedge means to operably bear against said third annular portion, said wedge means including a fourth surface extending perpendicularly from said first inner surface toward said second outer surface of said wedge means and being spaced from said third end surface thereof, said fourth surface of said wedge means being operably disposed adjacent to said second annular portion, such that axial movement of said rod in a second direction causes said fourth surface of said wedge means to operably bear against said second annular portion, with said second and third annular portions being spaced apart along said rod to accommodate at least a portion of said wedge means therebetween; and (d) a tensioning body having a first inner surface and a second outer surface, said first inner surface of said tensioning body being operably and slidably engaged with said second outer surface of said wedge means, said first inner surface of said tensioning body being sloped with respect to said second outer surface of said tensioning body such that said second outer surface of said tensioning body is operably disposed in a generally parallel relationship with said respective first inner surfaces of said adjacent hollow bodies such that selective axial motion of said rod within said bracing means correspondingly and coaxially moves said wedge means, which coaxial movement of said wedge means progressively radially displaces said tensioning body so as to selectively impart contact pressure on respective inner surfaces of said adjacent hollow bodies.

2. A tensioning means as in claim 1 wherein said bracing means includes a second receptacle portion positioned at a side opposite to said first receptacle portion.

3. A tensioning means as in claim 2, wherein said second receptacle portion is specifically configured to operably receive a control bar for axial manipulation of said tensioning means within such hollow body.

4. A tensioning means as in claim 1 wherein said first receptacle portion has a central axis corresponding to an axis of rotation of said rod.

5. A tensioning means as in claim 4 wherein said bracing portion is radially disposed about said first receptacle in a plane perpendicular to said central axis.

6. A tensioning means as in claim 1 wherein said tensioning body includes a third end surface extending between said first and second surfaces thereof and perpendicularly to said second outer surface of said tensioning body, said third end surface being disposed immediately adjacent to said bracing portion such that said tensioning body operably bears against said bracing portion while being radially displaced by said wedge portion.

7. A tensioning means as in claim 6 wherein said third end surface of said tensioning body is slidably engaged with said bracing portion.

8. A tensioning means as in claim 1 wherein said wedge means is slidably coupled to said second portion of said rod between said second and third annular portions thereof.

9. A tensioning means as in claim 1, including one or more bearings disposed on said third annular portion at a position between said third annular portion and said third end surface of said wedge means.

10. A tensioning means as in claim 1, including one or more bearings disposed on said second outer surface of said tensioning body.

11. A tensioning means as in claim 1 wherein said rod includes a coupling portion disposed in a second end thereof, said coupling portion being configured to receive a rotation means thereto.

12. A tensioning means as in claim 1 being at least four inches in diameter.

* * * * *